(12) United States Patent
Slabaugh et al.

(10) Patent No.: US 7,720,268 B2
(45) Date of Patent: May 18, 2010

(54) SYSTEM AND METHOD FOR ULTRASOUND SPECIFIC SEGMENTATION USING SPECKLE DISTRIBUTIONS

(75) Inventors: Gregory G. Slabaugh, Princeton, NJ (US); Gozde Unal, West Windsor, NJ (US); Tong Fang, Morganville, NJ (US); Michael Wels, Itzgrund (DE)

(73) Assignee: Siemens Corporation, Iselin, NJ (US)

( * ) Notice: Subject to any disclaimer, the term of this patent is extended or adjusted under 35 U.S.C. 154(b) by 992 days.

(21) Appl. No.: 11/427,960

(22) Filed: Jun. 30, 2006

(65) Prior Publication Data

US 2007/0047788 A1 Mar. 1, 2007

Related U.S. Application Data

(60) Provisional application No. 60/699,804, filed on Jul. 15, 2005.

(51) Int. Cl.
*G06K 9/00* (2006.01)
(52) U.S. Cl. .................................... 382/128
(58) Field of Classification Search ................. 382/128
See application file for complete search history.

(56) References Cited

U.S. PATENT DOCUMENTS 7,519,206 B2 * 4/2009 Mulet-Parada et al. ...... 382/128

2006/0158447 A1 * 7/2006 McGraw et al. ............. 345/419

OTHER PUBLICATIONS

Stopping rules for active contour segmentation of ultrasound cardiac images, Zhong Tao and Hemant D. Tagare, Proc. SPIE 5747, 475 (Feb. 17, 2005), DOI:10.1117/12.595611.*
Michailovich, O., Tannenbaum, A., "De-speckling of Medical Ultrasound Images", submitted to IEEE Transaction on Ultrasonic, Ferroelectrics and Frequency Control, 2004.*
Michailovich, O.; Adam, D., "Robust estimation of ultrasound pulses using outlier-resistant de-noising," Medical Imaging, IEEE Transactions on , vol. 22, No. 3, pp. 368-381, Mar. 2003.*
Hyeokho Choi; Baraniuk, R., "Analysis of wavelet-domain Wiener filters," Time-Frequency and Time-Scale Analysis, 1998. Proceedings of the IEEE-SP International Symposium on , vol., No., pp. 613-616, Oct. 6-9, 1998.*
Sarti, A.; Corsi, C.; Mazzini, E.; Lamberti, C., "Maximum likelihood segmentation of ultrasound images with Rayleigh distribution," Ultrasonics, Ferroelectrics and Frequency Control, IEEE Transactions on , vol. 52, No. 6, pp. 947-960, Jun. 2005 URL: http://ieeexplore.ieee.org/stamp/stamp.jsp?arnumber=1504017&isnumber=32257.*

* cited by examiner

*Primary Examiner*—Charles Kim
*Assistant Examiner*—Nirav G Patel

(57) ABSTRACT

A method for segmenting a digitized ultrasound image includes providing a digitized in-phase/quadrature ultrasound image comprising a plurality of intensities defined on an N-dimensional grid, decorrelating the ultrasound image wherein spatial correlations are substantially reduced in the intensity data, modeling the decorrelated image intensities with a statistical distribution, propagating, an active contour in the image where the contour segments the image, where the contour is propagated based on the statistical distributions of intensity data inside and outside the active contour.

16 Claims, 8 Drawing Sheets

SYSTEM AND METHOD FOR ULTRASOUND SPECIFIC SEGMENTATION USING SPECKLE DISTRIBUTIONS

CROSS REFERENCE TO RELATED UNITED STATES APPLICATIONS

This application claims priority from "Ultrasound-Specific Segmentation via Decorrelation and Statistical Region-Based Active Contours", U.S. Provisional Application No. 60/699,804 of Slabaugh, et al., filed Jul. 15, 2005, the contents of which are incorporated herein by reference.

TECHNICAL FIELD

This invention is directed to the segmentation of ultrasound images.

DISCUSSION OF THE RELATED ART

Ultrasound is one of the most commonly used medical imaging modalities. Compared to other modalities such as X-ray, MR, and PET, ultrasound scanning has many benefits, as it is fast, portable, relatively low cost, and presents virtually no risk to the patient. Despite its advantages, the primary limitation of ultrasound is image quality. Ultrasound images are corrupted by speckle noise, an interference pattern resulting from the coherent accumulation of random scattering in a resolution cell of the ultrasound beam. While the texture of the speckle does not correspond to any underlying structure, the local brightness of the speckle pattern is related to the local echogenicity of the underlying scatterers. The speckle appears as a spatisially correlated noise pattern and has a detrimental effect on the image quality and interpretability. For example, it has been shown that due to speckle, the detectability of lesions in ultrasound is significantly lower compared to X-ray and MR.

It is well known that speckle noise exhibits an asymmetric distribution as well as significant spatial correlation. Since the speckle obfuscates the structures of interest, it poses a difficult challenge to segmentation algorithms. Previous attempts at developing methods for ultrasound segmentation have not fully considered the full statistical nature of the speckle noise. Many methods assume that the pixels in an ultrasound image are spatially uncorrelated and the intensities follow a Gaussian distribution. Such assumptions render the problem more tractable, but are oversimplifications that result in generic segmentation approaches that are actually more suitable to other imaging modalities than ultrasound. Other methods use non-Gaussian distributions, but none of these methods addresses the correlation of the noise.

SUMMARY OF THE INVENTION

Exemplary embodiments of the invention as described herein generally include methods and systems for an ultrasound-specific segmentation that addresses the spatial correlation of the speckle by decorrelating the image. Segmentation is performed on the whitened result using an active contour guided by region-based forces that are derived from statistical measures from parametric speckle distribution models. In particular, a gradient ascent flow evolves the active contours to maximize a log likelihood functional based on the Fisher-Tippett distribution, which is the theoretical intensity distribution for fully formed speckle in the log-compressed image. Experimental results demonstrate the effectiveness of ultrasound segmentation methods according to embodiments of the invention.

According to an aspect of the invention, there is provided a method for segmenting digitized ultrasound images including providing a digitized in-phase/quadrature ultrasound image comprising a plurality of intensity data values defined on a N-dimensional grid of points, decorrelating said ultrasound image wherein spatial correlations are substantially reduced in said intensity data, modeling said decorrelated image intensities with a statistical distribution, propagating an active contour in said image wherein said contour segments said image, wherein said contour is propagated based on said statistical distributions of data inside and outside said active contour.

According to a further aspect of the invention, the method includes determining a magnitude of said in-phase/quadrature image and log-compressing said magnitude image.

According to a further aspect of the invention, decorrelation is performed using a whitening filter.

According to a further aspect of the invention, decorrelation comprises removing outliers from a Fourier transformed IQ image to obtain a reduced IQ image, filtering said reduced IQ image with a wavelet transform to obtain a spectrum of a point spread function, and applying a Wiener deconvolution filter to said IQ image and said point spread function spectrum to obtain a de-correlated image.

According to a further aspect of the invention, the outliers are defined by computing residuals $R(\vec{x})$ of said IQ image $G(\vec{x})$, $$R(\vec{x}) = \begin{cases} \text{sign}(\Delta G(\vec{x})) \cdot (|\Delta G(\vec{x})| - \lambda), & \text{if } |\Delta G(\vec{x})| \geq \lambda \\ 0, & \text{if } |\Delta G(\vec{x})| \leq \lambda \end{cases},$$

wherein $(\vec{x})$ represent a point, $\Delta G$ is a difference between G and a median-filtered version of G, and $\lambda$ is a predefined threshold wherein $\lambda$ is dynamically adapted to a level such that a pre-defined percentage of the differences $\Delta G$ is preserved, and wherein said outliers are removed by subtracting said residuals from said IQ image.

According to a further aspect of the invention, the Wiener deconvolution filter includes a term proportional to $$DFT^{-1}\left\{\frac{DFT\{g(\vec{x})\}}{\sqrt{|S|^2 + \varepsilon}}\right\},$$

wherein DFT represents a discrete Fourier transform, S represents said spectrum of said point spread function, $g(\vec{x})$ represents said IQ image, and $0 < \varepsilon \ll 1$.

According to a further aspect of the invention, propagating said active contour comprises initializing a contour to a closed hypercurve that divides the image into two regions, determining for each region a statistical distribution that maximizes a likelihood function of said distribution in each said region, and propagating said contour in a normal direction using an Euler-Lagrange equation derived from said likelihood function, where the contour is a level set of a scalar function whose values are negative in one region and positive in the other region.

According to a further aspect of the invention, the likelihood function includes a term to regularize said contour.

According to a further aspect of the invention, the statistical distribution is a Fishier-Tippett distribution, and wherein said likelihood function includes the terms $$\int_{\Omega_i} (\ln 2 + 2I(\vec{x}) - \ln\sigma_i^2 - \exp(2I(\vec{x}) - \ln\sigma_i^2))d\vec{x} +$$

$$\int_{\Omega_o} (\ln 2 + 2I(\vec{x}) - \ln\sigma_o^2 - \exp(2I(\vec{x}) - \ln\sigma_o^2))d\vec{x}$$

wherein $I(\vec{x})$ is the image intensity for point $(\vec{x})$, i and o denote regions inside and outside the contour, respectively, and $\sigma_i$ and $\sigma_o$ are the Fisher-Tippett parameters inside regions $\Omega_i$ and $\Omega_o$.

According to a further aspect of the invention, the statistical distribution is a Rayleigh distribution, and wherein said likelihood function includes the terms $$\int_{\Omega_i} \left( \ln I(\vec{x}) - \frac{I(\vec{x})^2}{2\sigma_i^2} \right) d\vec{x} - 2A_i \ln\sigma_i + \int_{\Omega_o} \left( \ln I(\vec{x}) - \frac{I(\vec{x})^2}{2\sigma_o^2} \right) d\vec{x} - 2A_o \ln\sigma_o,$$

wherein $I(\vec{x})$ is the image intensity for point $(\vec{x})$, i and o denote regions inside and outside the contour, respectively, $A_i$ and $A_o$ are the areas of regions $\Omega_i$ and $\Omega_o$, and $\sigma_i$ and $\sigma_o$ are the Rayleigh parameters inside regions $\Omega_i$ and $\Omega_o$.

According to another aspect of the invention, there is provided a program storage device readable by a computer, tangibly embodying a program of instructions executable by the computer to perform the method steps for segmenting a digitized ultrasound image.

DETAILED DESCRIPTION OF THE PREFERRED EMBODIMENTS

Exemplary embodiments of the invention as described herein generally include systems and methods for ultrasound-specific segmentation approaches that address both the spatial correlation of the speckle data as well as its intensity distribution. The ultrasound image is decorrelated by applying a whitening filter. This filtering operation can substantially reduce the spatial correlation of the data while maintaining its diagnostic information. A statistical region-based flow based on the Fisher-Tippett (FT) distribution is used to evolve an active contour to relevant structures. This flow propagates the active contour using statistical measures of the data inside and outside the active contour. The contours are modeled using a level set approach, which provides sub-pixel resolution and easily handles topological changes, and a numerical optimization strategy propagates along the gradient direction to maximize a log-likelihood functional.

As used herein, the term "image" refers to multi-dimensional data composed of discrete image elements (e.g., pixels for 2-D images and voxels for 3-D images). Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 1:
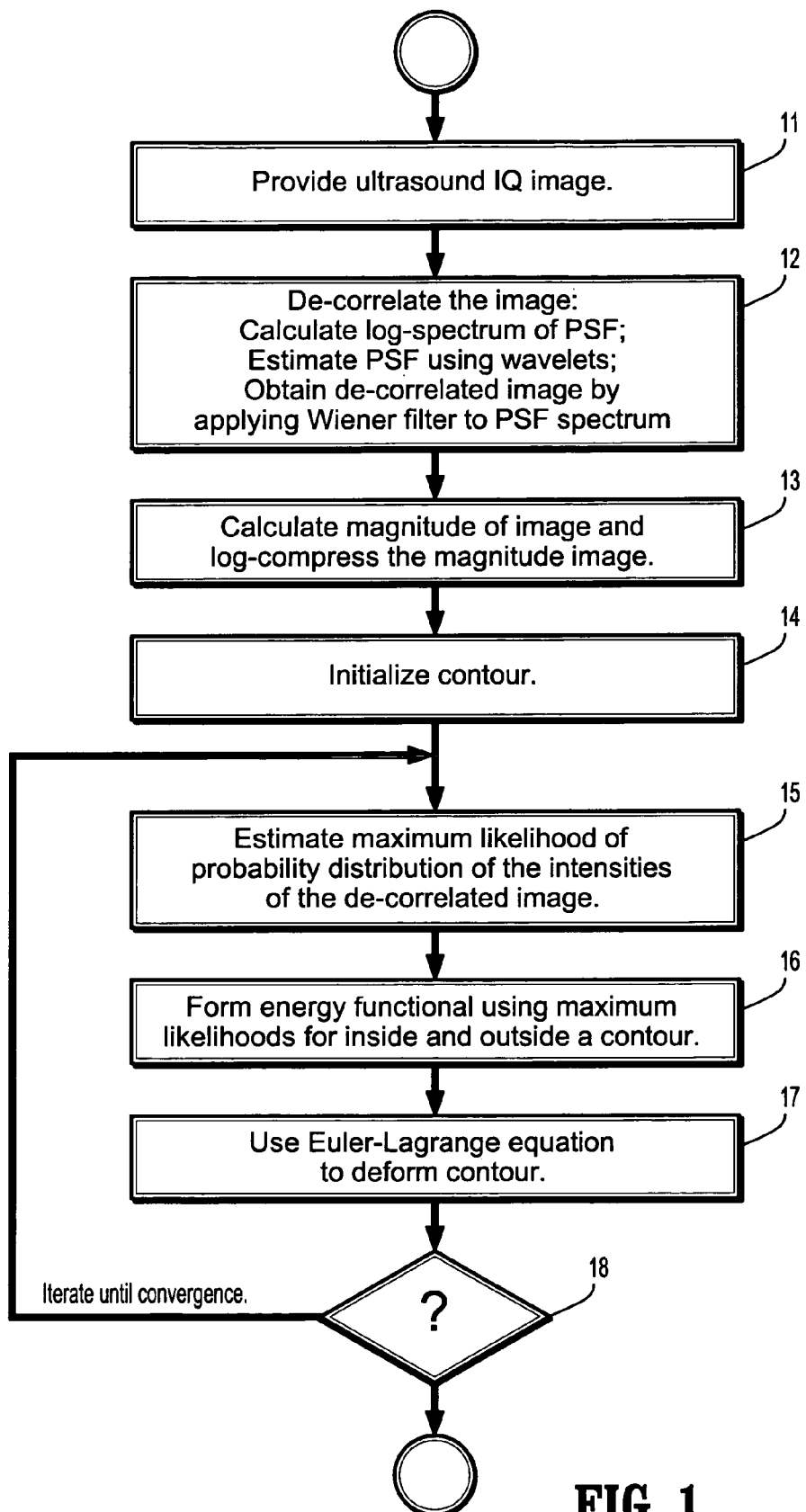
FIG. 1 depicts a flow chart of a method for ultrasound segmentation according to an embodiment of the invention.

FIG. 1 depicts a flow chart of a method for ultrasound segmentation according to an embodiment of the invention. A method according to an embodiment of the invention such as that illustrated in FIG. 1 is applicable to both 2-dimensional and 3-dimensional ultrasound (US) images. The specifics of each of the steps are discussed in more detail below. Referring to the flow charts an input image is provided at step 11. The input to a segmentation method according to an embodiment of the invention is an in-phase/quadrature (IQ) image obtained by applying frequency demodulation to a standard radio-frequency (RF) image obtained from an ultrasound transducer. This B-mode IQ image is complex. The image is filtered at step 12 to remove spatial correlations in the ultrasound image. This can be performed by calculating the log-spectrum of the point spread function (PSF) via wavelet noising, and then applying a Wiener filter using the spectrum magnitude of the PSF. Since the filtered image is complex and typically has a large dynamic range, the magnitude (i.e. absolute value) of the image is calculated and the magnitude image is log-compressed at step 13. The contour is initialized at step 14. The initial contour can be any shape, such as a square, and can be specified by a user or can be specified automatically. The segmentation algorithm is iterative, and given the initial contour, proceeds as follows. First, at step 15, two maximum likelihood parameters for a probability distribution function (PDF) of the intensities are estimated, one for the region inside the contour and the other for the region outside the contour. Exemplary PDFs that can describe the image intensity distribution are the Rayleigh distribution and the Fisher-Tippett distribution. These estimated parameters are then used in step 16 to form an energy functional. The Euler-Lagrange equation of this functional defines forces that deform the contour, and the contour is deformed accordingly in step 17. Given a new deformed contour, the method then returns to step 15, and iterates at step 18 the steps of estimating new maximum likelihood parameters, forming an energy functional, and deforming the contour until the active contour converges, achieving the final segmentation.

Intensity Distribution

Speckle noise is an interference pattern resulting from the coherent accumulation of random scattering in a resolution cell of the ultrasound beam. In the case of fully formed speckle, which is typically assumed when the number of scatters per cell is greater than ten, it can be assumed that each scatterer contributes an independent random complex component, resulting in a random walk in the complex plane. If one applies the central limit theorem to the random walk, one observes that the distribution is a Gaussian probability distribution function (PDF) in the complex plane:

$$p_Z(z) = \frac{1}{2\pi\sigma^2}\exp\left(\frac{-|z|^2}{2\sigma^2}\right),$$

where z is complex. This PDF models the data in the IQ image. To produce a real image for display, envelope detection is performed by taking the magnitude of the IQ image. It can be shown that under this transformation, the distribution in the magnitude image is a Rayleigh distribution:

$$p_X(x) = \frac{x}{\sigma^2}\exp\left(\frac{-x^2}{2\sigma^2}\right),$$

where x is real. Typically, the magnitude image has a large dynamic range, and therefore the standard is to log-compress the image to produce an image suitable for display. Taking a log, Y=log(X), one can derive the distribution in the log image:

$$p_Y(y) = p_X(x)\left|\frac{dy}{dx}\right|^{-1},$$

and using $dy/dx=1/x=e^{-y}$, to get $$p_Y(y)=2\exp(2y-\ln(2\sigma^2)-\exp(2y-\ln(2\sigma^2))),$$

which is a doubly exponential distribution that has the form of a Fisher-Tippett distribution. This distribution can be used as a theoretical model for the speckled image intensities in the log-compressed IQ image.

Figure 2:
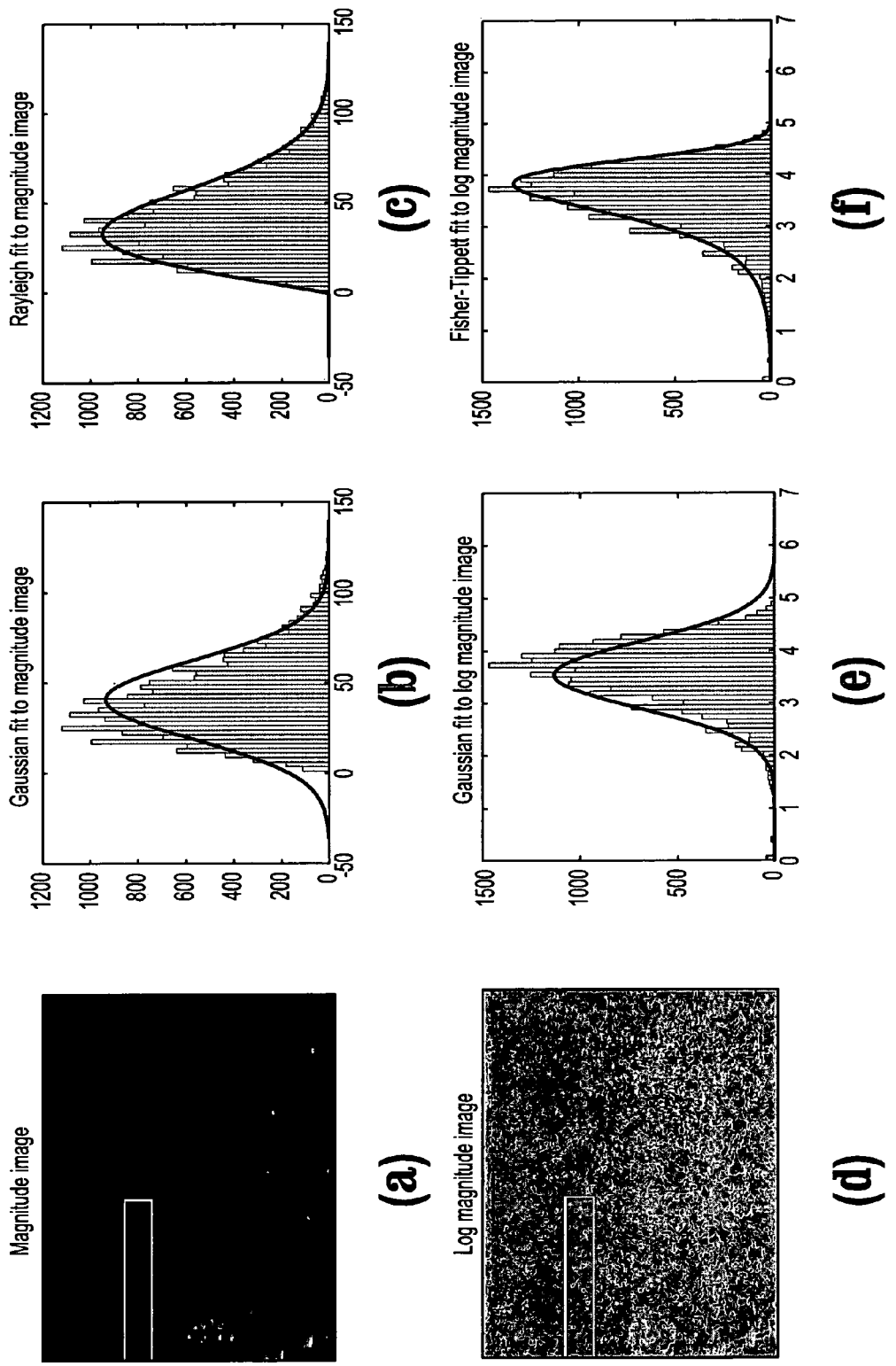
FIG. 2 shows an ultrasound image of a lesion phantom for comparing Gaussian, Rayleigh and Fisher-Tippett distributions, according to an embodiment of the invention.

FIG. 2 shows an ultrasound image of a lesion phantom for comparing Gaussian, Rayleigh and Fisher-Tippett distributions, according to an embodiment of the invention. A white box indicates an image region corresponding to "soft tissue." where the primary variation in the image intensity is due the speckle noise. The magnitude of the IQ image is shown in FIG. 2(a). The dark appearance results from the large dynamic range of the intensities. The histogram of the magnitude IQ image is shown in FIG. 2(b), where it is fit to a Gaussian distribution, which does not accurately represent the distribution. A mean square error (MSE) for this fit was 13,120. In FIG. 2(c) the histogram of the magnitude IQ image is fit to a Rayleigh distribution, which is a much more accurate representation, resulting in an MSE of 3961, 69.8% less than that of the Gaussian fit. The log-compressed image is shown in FIG. 2(d), which is a typical presentation of an ultrasound image. The white box shows a selected region of pixels in the image, and a Gaussian distribution is fit to the histogram of the pixel intensities, as shown in FIG. 2(e). The Gaussian distribution is similarly inaccurate for modeling this asymmetric histogram, which has an MSE of 14,770. In contrast, in FIG. 2(f), a Fisher-Tippett distribution was fit to the histogram, which accurately models the intensity distribution, with an MSE of 3938, 73.3% less than that of the Gaussian fit. Note that application of the Rayleigh distribution to the log-compressed IQ image is not ideal, as the Rayleigh and Fisher-Tippett distributions are notably different. Among other differences, the long tail of the Rayleigh distribution is located to the right of the peak, while in the Fisher-Tippett distribution, the long tail is found on the left side of the peak.

Figure 3:
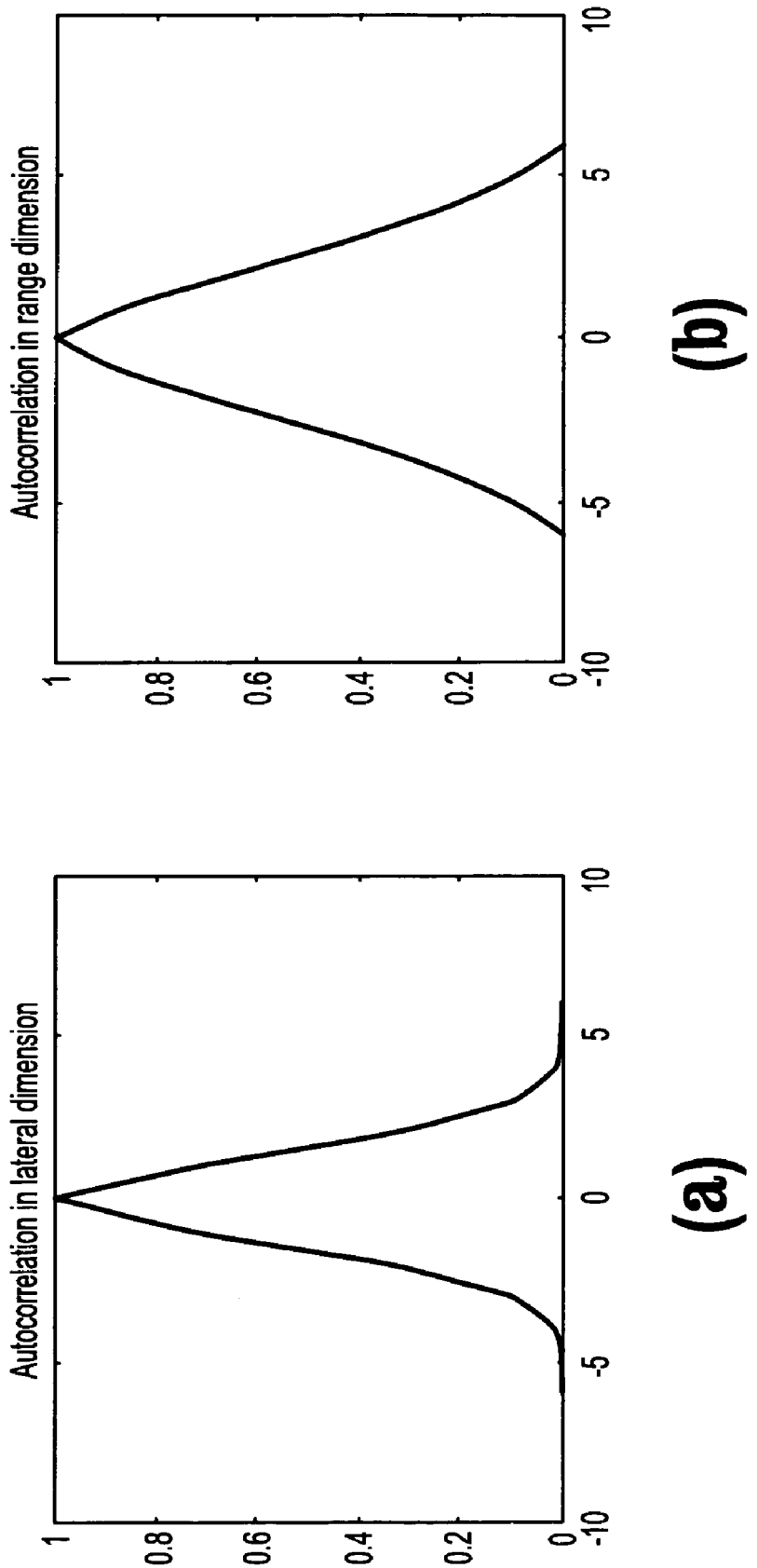
FIGS. 3(a)-(b) depict spatial correlation of an ultrasound image, according to an embodiment of the invention.

To understand the spatial correlation, consider a standard image formation model where the backscattered signal and the tissue reflectivity function (which describes the overall reflections in a tissue by defining relative strengths of acoustic reflectors and scatterers as a function of spatial coordinates) obey a simple relationship based on linear systems theory. Under the assumption of linear wave propagation and weak scattering, the IQ image can be considered to be the result of the convolution of the point spread function (PSF) of the imaging system with the tissue reflectivity function:

$$g(\vec{x})=f(\vec{x})\circ h(\vec{x})+u(\vec{x}),$$

where ($\vec{x}$) represents a 2D pixel or 3D voxel, $g(\vec{x})$, $f(\vec{x})$, and $h(\vec{x})$ represent the IQ image, the tissue reflectivity function, and the PSF, respectively. The additive term $u(\vec{x})$ describes measurement noise and physical phenomena that are not covered by the convolution model. In the equation above, the received IQ image $g(\vec{x})$ can be considered to be a filtered version of the true reflectivity function $f(\vec{x})$. The spatial extent of the PSF is dependent upon the size of the aperture as well as the frequency of the ultrasound imaging. Since the PSF is essentially a finite bandwidth low-pass filter, it imparts non-negligible spatial correlation to the IQ image. The correlation can be measured experimentally by calculating the half-bandwidth of the autocorrelation function of the log magnitude IQ image, as shown in FIG. 3. FIG. 3(a) shows a plot of the autocorrelation function in the lateral (horizontal) dimension of the selected region from FIG. 2, and FIG. 3(b) shows the plot in the range (vertical) direction. Notice that the autocorrelation function has a notable bandwidth indicating the spatial correlation of the data. As can be seen from the figures, speckle noise in any real imaging situation has significant spatial correlation that should be addressed by all ultrasound segmentation method. To address the spatial correlation, the IQ image can be transformed using a whitening filter that substantially decorrelates the data, resulting in another IQ image with pixels that correlate less than the original image.

Decorrelation

It is possible to suppress the correlation by "undoing" the effect of the PSF through the process of deconvolution. As the PSF usually is not available a priori when dealing with tissue images, the deconvolution is executed blindly. Transpiring the above image formation model into the frequency domain and applying log-transformation to the magnitudes of its components, one obtains:

$$G(\vec{\omega})=H(\vec{\omega})+F(\vec{\omega}),$$

where ($\vec{\omega}$) represents a 2- or 3-dimensional vector in Fourier space, $G(\vec{\omega})$, $F(\vec{\omega})$, and $H(\vec{\omega})$ represent the log-magnitude of the Fourier transforms of the IQ image, the tissue reflectivity function, and the complex PSF, respectively. For simplicity, the additive noise term can be ignored. In an exemplary, non-limiting embodiment of the invention, the log-spectrum of $\vec{H(\omega)}$ can be calculated by first removing the outliers from $\vec{G(\omega)}$, in effect reducing the tail of the distribution, and by then estimating the PSF by means of wavelet denoising.

H can be estimated as follows. First, an outlier shrinkage step computes the robust residuals R of G, with $$R(\vec{x}) = \begin{cases} \text{sign}(\Delta G(\vec{x})) \cdot (|\Delta G(\vec{x})| - \lambda), & \text{if } |\Delta G(\vec{x})| \geq \lambda \\ 0, & \text{if } |\Delta G(\vec{x})| \leq \lambda \end{cases},$$

where $\Delta G$ is the difference between G and its median-filtered version and $\lambda$ is a predefined threshold. In an exemplary, non-limiting embodiment of the invention, a median filter of size 3×3 (or 3×3×3 in 3D) is used and $\lambda$ is dynamically adapted to a level such that a certain percentage (75%) of the differences, $\Delta G$ is preserved. Next, the signal G-R can be filtered to get an estimation of the PSF spectrum H. An exemplary, non-limiting filter uses wavelet denoising with a separable wavelet transform based on a nearly symmetric wavelet having six vanishing moments.

Once an estimate of H is computed, the spectrum magnitude S of the PSF is given by $S=e^H$. An equalized IQ image $\tilde{g}$ is then obtained by applying the classical deconvolution Wiener filter:

$$\tilde{g}(\vec{x}) = DFT^{-1}\left\{\frac{DFT\{g(\vec{x})\}}{\sqrt{|S(\varpi)|^2 + \varepsilon}}\right\},$$

with $0<\epsilon\ll 1$.

Figure 4:
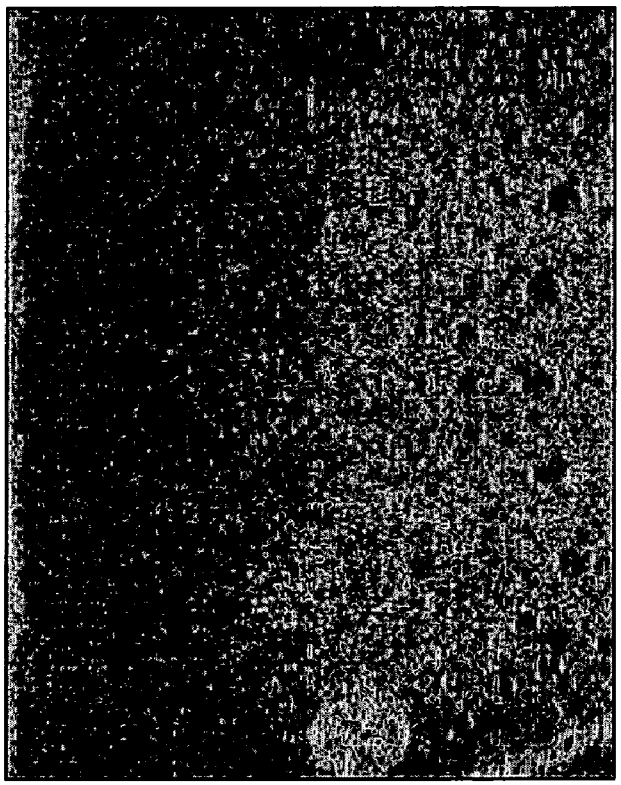
FIGS. 4(a)-(b) show decorrelation of a tumor phantom image, according to an embodiment of the invention.
Figure 4:
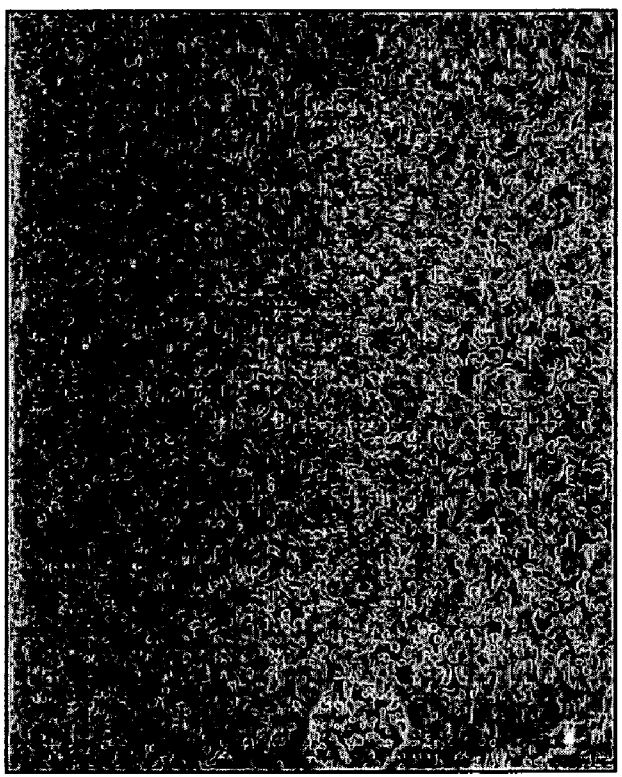

FIGS. 4(a)-(b) show decorrelation of a tumor phantom image. FIG. 4(a) shows the original image, and FIG. 4(b) shows the decorrelated image. The speckle size is significantly reduced in the decor-related image, and the noise in the decorrelated image has significantly less spatial correlation. The halfbandwidth size has decreased to 1.4 pixels in the lateral dimension and 2.5 in the range dimension. Visually, this decorrelated image appears to have a higher spatial resolution as finer details become apparent.

Figure 5:
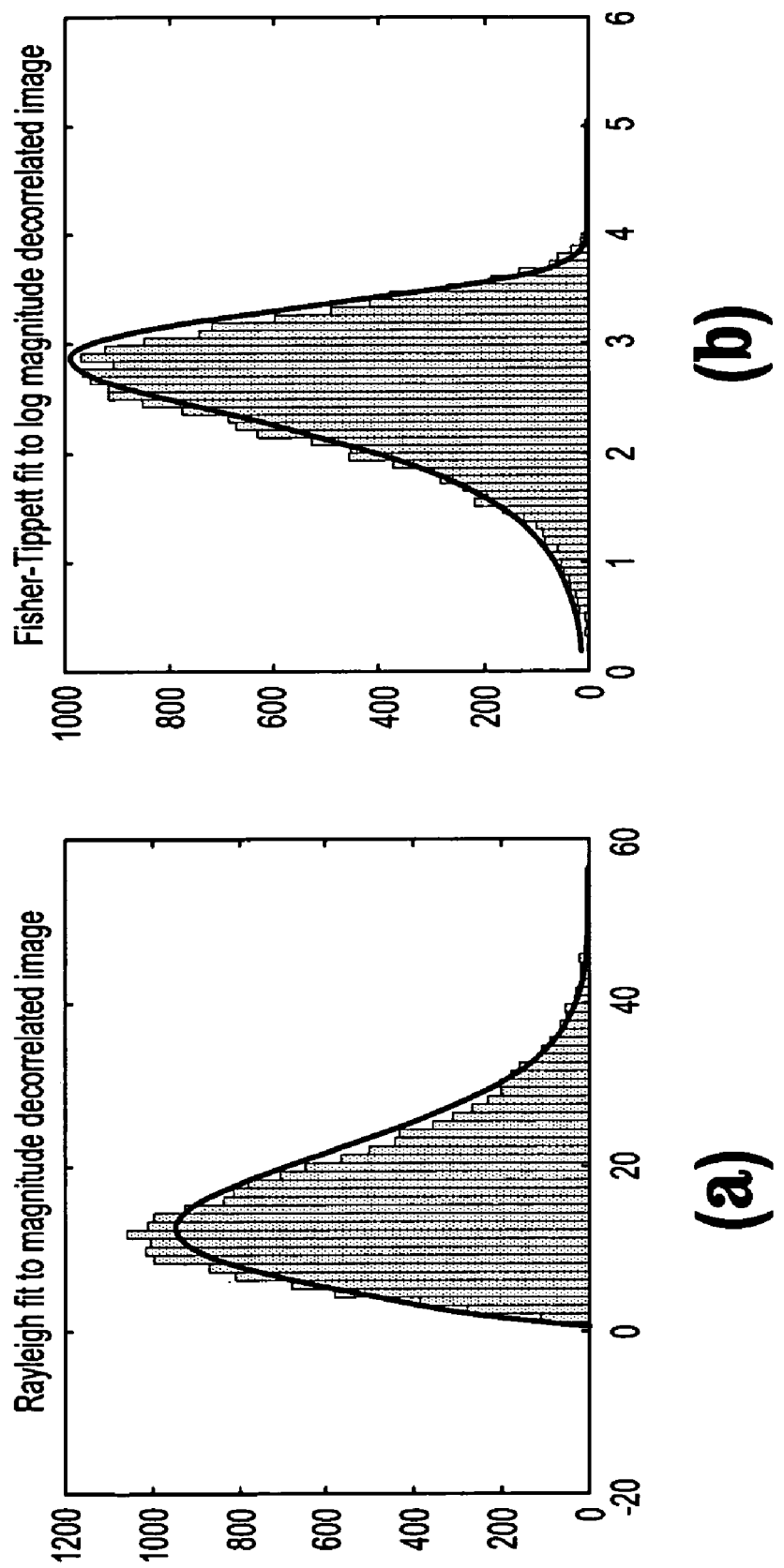
FIGS. 5(a)-(b) depict intensity distributions of the decorrelated image, according to an embodiment of the invention.

To check that the Rayleigh and Fisher-Tippett distribution models still apply to magnitude and log magnitude decorrelated IQ images, the previous experiment of fitting Rayleigh and Fisher-Tippett distributions to histograms formed over the same soft tissue region in the phantom image were repeated. FIGS. 5(a)-(b) depict intensity distributions of the decorrelated image, according to an embodiment of the invention. The Rayleigh fit to the magnitude IQ image is shown in FIG. 5(a), and the Fisher-Tippett fit to the log magnitude IQ image is shown in FIG. 5(b). The decorrelation step does not significantly affect the distributions, which still provide an excellent fit to the data. As demonstrated in FIG. 5, the decorrelation does not significantly affect the distribution.

The decorrelation method described above is exemplary and non-limiting, and other decorrelations methods as are known in the art can be used to reduce spatial correlations. A non-limiting list of examples of other decorrelation methods includes power spectrum equalization, constrained least squares filtering, two-dimensional homomorphic deconvolution, and two-dimensional noise-robust blind deconvolution.

Region-Based Segmentation: Maximum Likelihood Fisher-Tippett Flow

According to an embodiment of the invention, a flow for maximum likelihood region-based segmentation of an image described by Fisher-Tippett distributions involves evolving a contour embedded as the zero level set of a higher dimensional function based on statistical measures computed both inside and outside the contour. This contour will be a curve in a 2D image, and a surface in a 3D image, or more generally, a hypercurve embedded in a higher dimensional space. Although the following description will be in terms of a 2D curve, it will be readily apparent to one of ordinary skill how to apply the methods to the propagation of a surface in a 3D image.

Let $I(\vec{x})$ denote a pixel intensity in the decorrelated log magnitude IQ image at the location $(\vec{x})$. The Fisher-Tippett PDF for a pixel's intensity can be written as $$p(I(\vec{x})) = 2\exp(2I(\vec{x}) - \ln(2\sigma_1^2) - \exp(2I(\vec{x}) - \ln(2\sigma_1^2))).$$

where $\sigma^2$ represents the Fisher-Tippett parameter of the reflectivity samples. For a region $\Omega$ in the image, the log likelihood can then be expressed as $$l = \int_\Omega (\ln 2 + 2I(\vec{x}) - \ln(2\sigma^2) - \exp(2I(\vec{x}) - \ln(2\sigma^2))) d\vec{x}.$$

An expression for $\sigma^2$ that is the maximum likelihood estimator of the FT distribution can be found by taking the derivative of l and setting the expression equal to zero:

$$\frac{\partial l}{\partial \sigma} = \int_\Omega \left(-\frac{4\sigma}{2\sigma^2} + (\exp(2I(\vec{x})) - \ln(2\sigma^2)))\frac{4\sigma}{2\sigma^2}\right) d\vec{x} = 0.$$

Solving for $\sigma^2$ yields:

$$\sigma^2 = \frac{1}{2}\frac{\int_\Omega \exp(2I(\vec{x})) d\vec{x}}{\int_\Omega d\vec{x}}$$

Thus, given a region $\Omega$ with area (or volume) given by $\int_\Omega d\vec{x}$, the maximum likelihood value of the Fisher-Tippett distribution can be computed from the image intensities in the region, to estimate the Fisher-Tippett parameter $\sigma^2$ both inside and outside the active contour.

According to an embodiment of the invention, a curve C can be deformed to achieve a maximum likelihood segmentation of the data. Recall that the Fisher-Tippett distribution is given as $$p(I(\vec{x})) = 2\exp(2I(\vec{x}) - \ln(2\sigma_1^2) - \exp(2I(\vec{x}) - \ln(2\sigma_1^2))).$$

where $\sigma$ is the parameter of the distribution and $I(\vec{x})$ is the image pixel intensity at pixel/voxel $(\vec{x})$. Let i and o denote regions inside and outside the contour, respectively, $\sigma_i$ and $\sigma_o$ be parameters calculated inside and outside the contour C.

The log-likelihood is therefore $$l(I, C, \sigma_i, \sigma_o) = \begin{bmatrix} \int_{\Omega_i} (\ln 2 + 2I(\vec{x}) - \ln\sigma_i^2 - \exp(2I(\vec{x}) - \ln\sigma_i^2))d\vec{x} + \\ \int_{\Omega_o} (\ln 2 + 2I(\vec{x}) - \ln\sigma_o^2 - \exp(2I(\vec{x}) - \ln\sigma_o^2))d\vec{x} \end{bmatrix}.$$

Noting that $\sigma_i$ and $\sigma_o$ are constant in the regions i and o respectively, and integrating the constant terms, we rewrite this expression as $$l(I, C, \sigma_i, \sigma_o) =$$
$$\begin{bmatrix} A_i \ln 2 + 2\int_{\Omega_i} I(\vec{x})d\vec{x} - A_i \ln\sigma_i^2 - \exp(-\ln\sigma_i^2)\int_{\Omega_i} \exp(2I(\vec{x}))d\vec{x} + \\ A_o \ln 2 + 2\int_{\Omega_o} I(\vec{x})d\vec{x} - A_o \ln\sigma_o^2 - \exp(-\ln\sigma_o^2)\int_{\Omega_o} \exp(2I(\vec{x}))d\vec{x} \end{bmatrix}$$

where $A_i = \int_{\Omega_i} d\vec{x}$ and $A_o = \int_{\Omega_o} d\vec{x}$ are the areas inside and outside the contour. For a given contour C, one can optimally estimate the Fisher-Tippett parameter for the regions i inside the contour and o outside the contour using the method described above, as $$\sigma_i^2 = \frac{1}{2} \frac{\int_{\Omega_i} \exp(2I(\vec{x}))d\vec{x}}{A_i},$$

$$\sigma_o^2 = \frac{1}{2} \frac{\int_{\Omega_o} \exp(2I(\vec{x}))d\vec{x}}{A_o}$$

These expressions for the distribution parameters can be substituted into the expression for the log-likelihood to obtain $$l(I, C, \sigma_i \sigma_o) = \begin{bmatrix} A_i \ln 2 + 2\int_{\Omega_i} I(\vec{x})d\vec{x} - A_i \ln\left(\frac{\int_{\Omega_i} \exp(2I(\vec{x}))d\vec{x}}{2A_i}\right) - 2A_i + \\ A_o \ln 2 + 2\int_{\Omega_o} I(\vec{x})d\vec{x} - A_o \ln\left(\frac{\int_{\Omega_o} \exp(2I(\vec{x}))d\vec{x}}{2A_o}\right) - 2A_o \end{bmatrix}.$$

All the terms that do not depend on the partition $\Omega_i$ and $\Omega_o$ can be omitted, yielding $$J(I, C) = A_i \ln\left(\frac{\int_{\Omega_i} \exp(2I(\vec{x}))d\vec{x}}{2A_i}\right) + A_o \ln\left(\frac{\int_{\Omega_o} \exp(2I(\vec{x}))d\vec{x}}{2A_o}\right).$$

As is common with level set contour evolutions, an additional term is included that penalizes the contour's arc length to regularize the contour. The complete energy functional is then:

$$E = \left[\alpha \int_C ds + A_i \ln\left(\frac{1}{2A_i}\int_{\Omega_i} \exp(2I(\vec{x}))d\vec{x}\right) + A_o \ln\left(\frac{1}{2A_o}\int_{\Omega_o} \exp(2I(\vec{x}))d\vec{x}\right)\right].$$

To compute the first variation of the energy functional, it is useful to introduce an auxiliary function $\phi: \Omega \to R$ such that $\phi < 0$ inside the contour in $\Omega_i$ and $\phi > 0$ outside the contour $\Omega_o$, thus defining the curve implicitly as the zero level set of $\phi$. Using the Heaviside function H, note that:

$$A_i = \int_\Omega H(\phi)d\vec{x},$$

$$A_o = \int_\Omega (1 - H(\phi))d\vec{x},$$

$$\text{length}\{\phi = 0\} = \int_\Omega |\nabla H(\phi)|d\vec{x} = \int_\Omega \delta(\phi)|\nabla \phi|d\vec{x}.$$

Using these expressions, the energy functional is re-expressed as $$E = \begin{bmatrix} \alpha \int_\Omega \delta(\phi)|\nabla \phi|d\vec{x} + \int_\Omega H(\phi)d\vec{x}\ln\left(\frac{\int_\Omega H(\phi)\exp(2I(\vec{x}))d\vec{x}}{2\int_\Omega H(\phi)d\vec{x}}\right) + \\ \int_\Omega (1 - H(\phi))d\vec{x}\ln\left(\frac{\int_\Omega (1 - H(\phi))\exp(2I(\vec{x}))d\vec{x}}{2\int_\Omega (1 - H(\phi))d\vec{x}}\right) \end{bmatrix}.$$

Taking the derivative with respect to $\phi$, yields, after some manipulations, the Euler-Lagrange equation:

$$\frac{\partial \phi}{\partial t} = \frac{\partial E}{\partial \phi} = \delta(\phi)\begin{bmatrix} \alpha \nabla \cdot \left(\frac{\nabla \phi}{|\nabla \phi|}\right) - \ln\sigma_i^2 + \frac{\sigma_i^2 - \frac{1}{2}\exp(2I(\vec{x}))}{\sigma_i^2} + \\ \ln\sigma_o^2 - \frac{\sigma_o^2 - \frac{1}{2}\exp(2I(\vec{x}))}{\sigma_o^2} \end{bmatrix},$$

which is equivalent to the more general equation in terms of the contour C:

$$\frac{\partial C}{\partial t} = \left(\log\sigma_i^2 - \log\sigma_o^2 + \frac{\frac{1}{2}\exp 2I - \sigma_i^2}{\sigma_i^2} - \frac{\frac{1}{2}\exp 2I - \sigma_o^2}{\sigma_o^2} + \alpha\kappa\right)N,$$

where $\kappa$ is the curvature and N is the normal to the contour.

This curve evolution equation is totally general in that it applies to any closed contour representation, be it a spline, polygon, etc. Note that this curve evolution can incorporate additional terms in addition to those considered above. The method requires an initial contour, which in one exemplary, non-limiting embodiment of the invention is a small square positioned by a user. The maximum likelihood FT parameters $\sigma_i^2$ and $\sigma_o^2$ are computed inside and outside the contour, respectively. Then, each point on the contour is moved along its normal direction using the Euler-Langrange equation. According to an embodiment of the invention, the technique is implemented using level set methods, which provide subpixel resolution and easily accommodate topological changes of the contour. A numerical optimization strategy propagates the flow along the gradient to maximize the likelihood function.

An analogous flow propagation equation can also be derived for the Rayleigh distribution. In this case, the likelihood function is $$l(I, C, \sigma_i, \sigma_o) = \begin{bmatrix} \int_{\Omega_i} \left( \ln I(\vec{x}) - \frac{I(\vec{x})^2}{2\sigma_i^2} \right) d\vec{x} - 2A_i \ln \sigma_i + \\ \int_{\Omega_o} \left( \ln I(\vec{x}) - \frac{I(\vec{x})^2}{2\sigma_o^2} \right) d\vec{x} - 2A_o \ln \sigma_o \end{bmatrix},$$

and the Euler-Lagrange equation takes the form $$\frac{\partial \phi}{\partial t} = \frac{\partial E}{\partial \phi} = \delta(\phi) \begin{bmatrix} \alpha \nabla \cdot \left( \frac{\nabla \phi}{|\nabla \phi|} \right) - \ln \sigma_i^2 + \frac{\sigma_i^2 - \frac{1}{2} I(\vec{x})^2}{\sigma_i^2} + \\ \ln \sigma_o^2 - \frac{\sigma_o^2 - \frac{1}{2} I(\vec{x})^2}{\sigma_o^2} \end{bmatrix}.$$

Results

Figure 6:
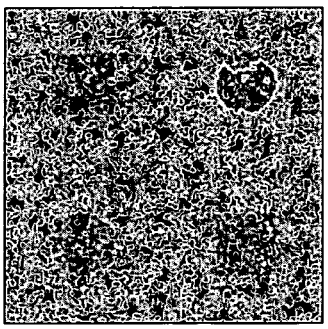
FIGS. 6(a)-(d) illustrate segmentation of synthetically generated data, according to an embodiment of the invention.
Figure 6:
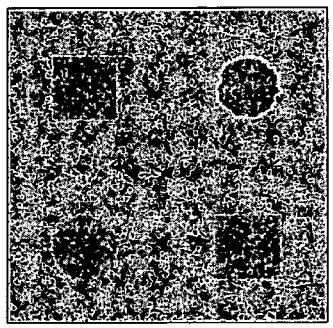
Figure 6:
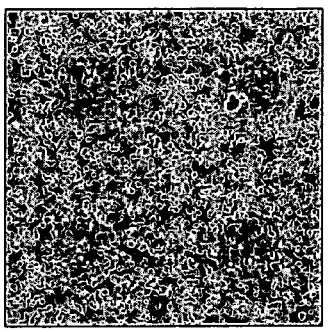
Figure 6:
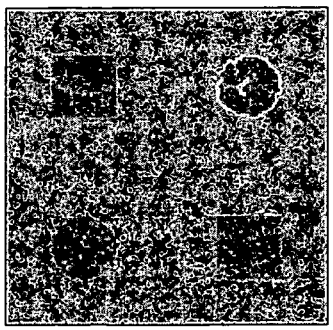

FIGS. 6(a)-(d) illustrate segmentation results using synthetically generated data consisting of darker targets on a lighter background, according to embodiments of the invention. In each experiment the segmentation was seeded with a small square in the center of the right lower circular target. In FIGS. 6(a) and (b), the Rayleigh and Fisher-Tippett flows are depicted, respectively, applied to the log magnitude IQ data. The Fisher-Tippett flow performs slightly better, but the speckle correlation prevents either segmentation from reaching all parts of the circle. In FIGS. 6(c) and (d), the Rayleigh and Fisher-Tippett flows are depicted, respectively, applied to the decorrelated image. Here, the best results are observed for the Fisher-Tippett flow, which successfully segments the target. For this synthetic data, there is a ground truth area, which is 7854 units. The areas inside the contours computed from the segmentations results were 763 for FIG. 6(a), 6393 for FIG. 6(b), 7548 for FIG. 6(c), and 7815 for FIG. 6(d). Similar results were obtained for the other shapes in the image. Thus, for this experiment, the Fisher-Tippett flow applied to the decorrelated image produces the best result, both visually and quantitatively.

Figure 7:
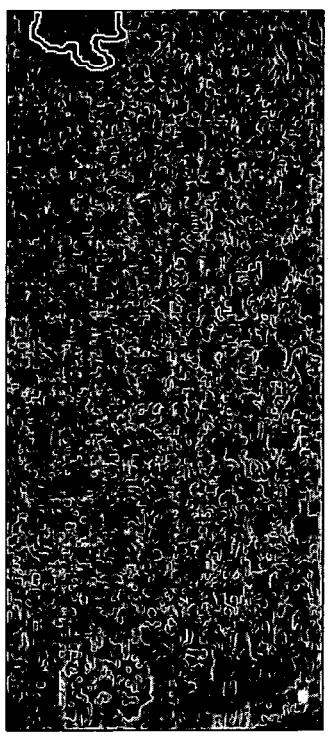
FIGS. 7(a)-(b) illustrate segmentation of a lesion phantom, according to an embodiment of the invention.
Figure 7:
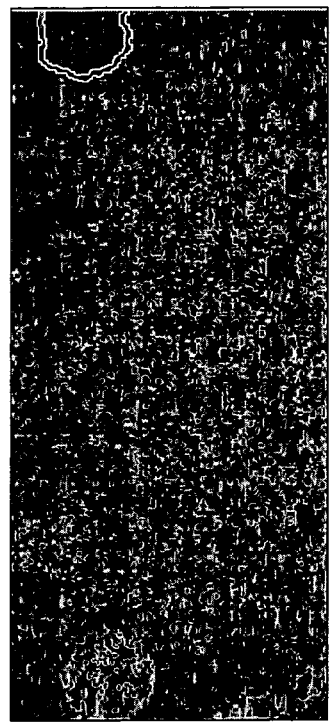

FIGS. 7(a)-(b) illustrate a result for the segmentation of the lesion phantom for the rightmost faint circular structure that simulates a tumor. FIG. 7(a) shows the result of applying the Rayleigh flow to the original log magnitude IQ image. This segmentation fails to complete properly due to the speckle and the inaccurate intensity distribution. FIG. 7(b) shows the result of applying, the Fisher-Tippett flow to the decorrelated log magnitude image. This segmentation results in a more circular shape that covers the entire area of the object. Thus, as with the synthetic data, the best results occur for the Fisher-Tippett flow on the decorrelated log magnitude image.

Figure 8:
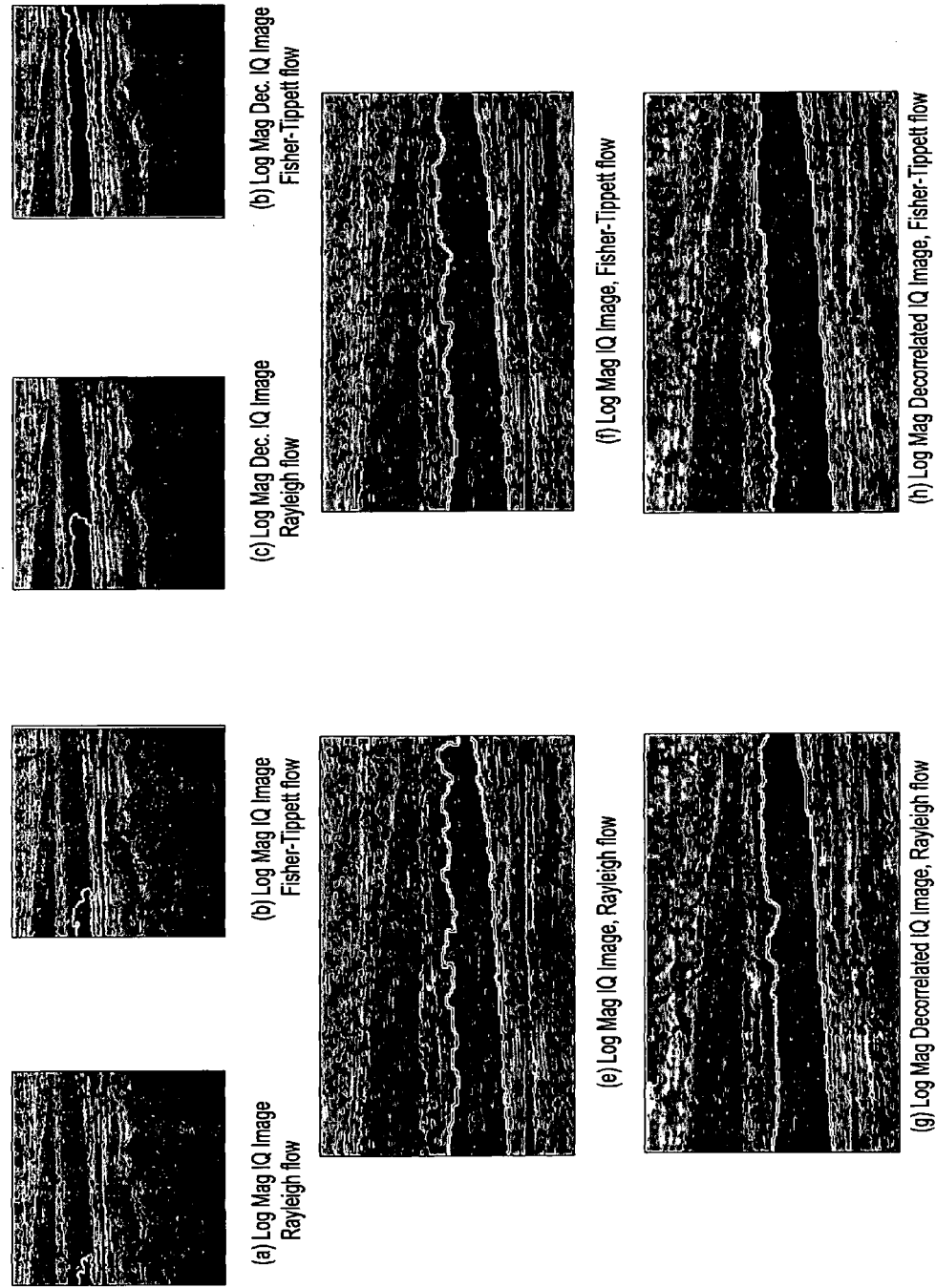
FIGS. 8(a)-(h) illustrate carotid artery segmentation, according to an embodiment of the invention.

FIGS. 8(a)-(h) present segmentation results using the Rayleigh and Fisher-Tippett flows applied to an original log magnitude IQ image and a decorrelated log magnitude IQ image of a human carotid artery, according to embodiments of the invention. In each example the segmentation was initialized with a small rectangular seed on the left side of the artery. FIGS. 8(a) and (b) show the result of the Rayleigh flow and Fisher-Tippett flow on the log magnitude IQ image, respectively. Neither achieves a successful result due to the correlation of the speckle, as well as the difficulty due to poor separation of the statistics inside and outside the contour resulting from the dark pixels in the lower half of the image. FIGS. 8(c) and (d) show the Rayleigh and Fisher-Tippett flows applied to the decorrelated image. Due to an inaccurate modeling of the intensity distribution, Rayleigh flow is still unable to propagate the length of the artery. However, the Fisher-Tippett flow significantly outperforms the Rayleigh flow, as the former propagates the entire length of the artery, producing the best result. FIGS. 8(e)-(h) illustrate results from repeating the previous experiment, this time cropping the image to its upper half. In this case, the statistics inside and outside the contour are better separated, so in this case all segmentations propagate the length of the artery. FIGS. 8(e) and (f) show that the correlation of the speckle results in multiple topology changes of the level set and an irregular shape that does not exactly match the artery borders. FIGS. 8(g) and (h) illustrate that better results are achieved for the decorrelated image, and due to its better modeling of the intensity distributions, the result for the Fisher-Tippett flow in FIG. 8(h) produces the best result.

Implementation

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
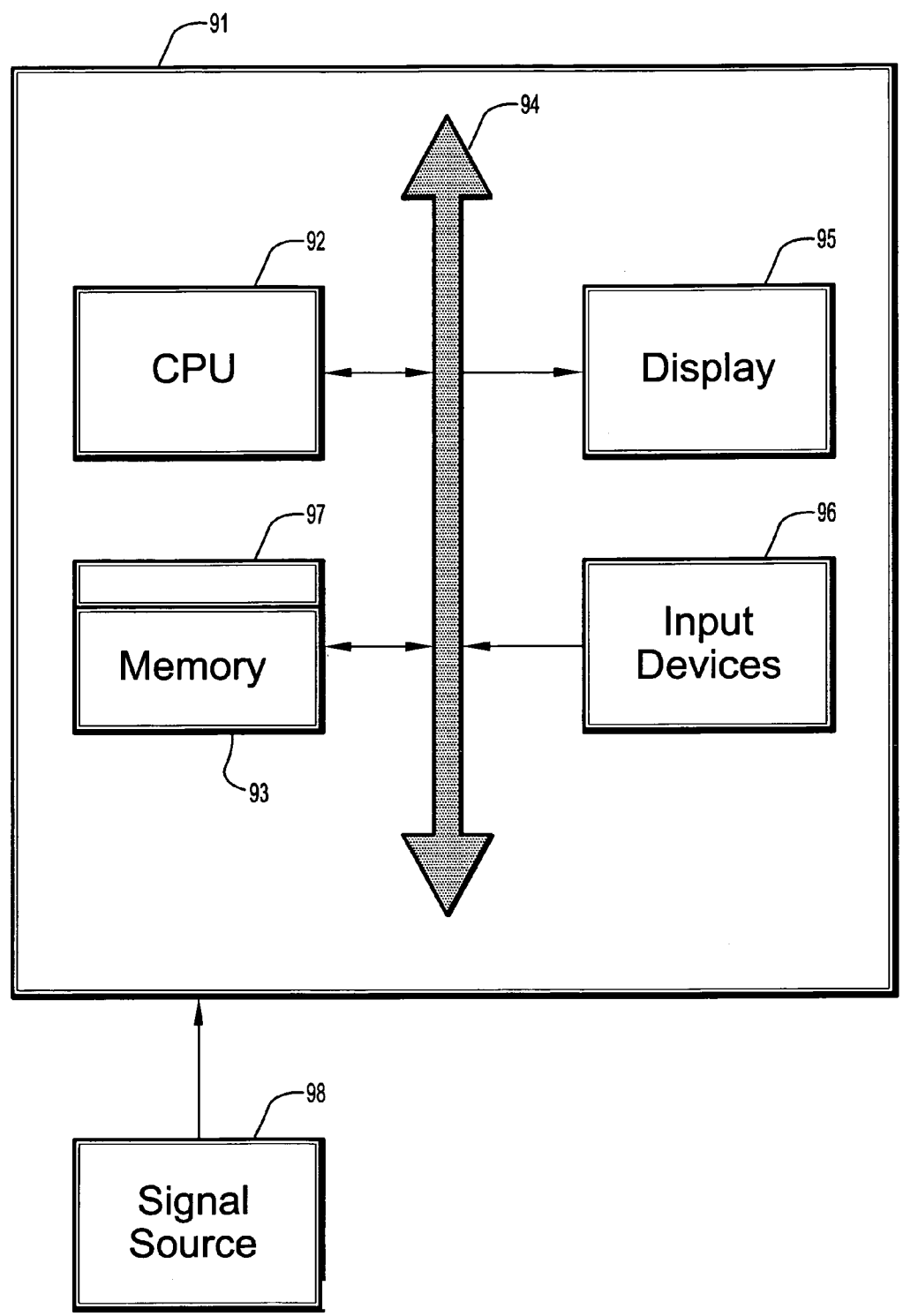
FIG. 9 is a block diagram of an exemplary computer system for implementing an ultrasound segmentation method according to an embodiment of the invention.

FIG. 9 is a block diagram of an exemplary computer system for implementing an ultrasound segmentation method according to an embodiment of the invention. Referring now to FIG. 9, a computer system 91 for implementing the present invention can comprise, inter calia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of segmenting a digitized ultrasound image comprising the steps of:
   providing a digitized in-phase/quadrature (IQ) ultrasound image comprising a plurality of intensity data values defined on a N-dimensional grid of points;
   decorrelating said ultrasound image wherein spatial correlations are removed in said intensity data;
   modeling said decorrelated image intensities with a statistical distribution;
   propagating an active contour in said image by initializing a contour to a closed hypercurve that divides the image into two regions, determining for each region a statistical distribution that maximizes a likelihood function of said distribution in each said region, and propagating said contour in a normal direction using an Euler-Lagrange equation derived from said likelihood function, wherein said contour is a level set of a scalar function whose values are negative in one region and positive in the other region, wherein said contour segments said image, wherein said statistical distribution is a Fisher-Tippet distribution, and wherein said likelihood function includes the terms $$\int_\Omega (\ln 2 + 2l(\vec{x}) - \ln_{\sigma_i}^2 - \exp(2l(\vec{x}) - \ln_{\sigma_i}^2)) \, \vec{d}x$$

$$\int_{\Omega_o} (\ln 2 + 2l(\vec{x}) - \ln_{\sigma_o}^2 - \exp(2l(\vec{x}) - \ln_{\sigma_o}^2)) \, \vec{d}x$$

wherein $l(\vec{x})$ is the image intensity for point $(\vec{x})$, i and o denote regions inside and outside the contour, respectively, and $\sigma_i$ and $\sigma_o$ are the Fisher-Tippett parameters inside regions $\Omega_i$ and $\Omega_o$.

2. The method of claim 1, further comprising determining a magnitude of said in-phase/quadrature image and log-compressing said magnitude image.

3. The method of claim 1, wherein decorrelation is performed using a whitening filter.

4. The method of claim 3, wherein decorrelation comprises removing outliers from a Fourier transformed IQ image to obtain a reduced IQ image, filtering said reduced IQ image with a wavelet transform to obtain a spectrum of a point spread function, and applying a Wiener deconvolution filter to said IQ image and said point spread function spectrum to obtain a de-correlated image.

5. The method of claim 4, wherein said outliers are defined by computing residuals $R(\vec{x})$ of said IQ image $G(\vec{x})$, $$R(\vec{x}) = \begin{cases} \text{sign}(\Delta G(\vec{x})) \cdot (|\Delta G(\vec{x})| - \lambda), & \text{if } |\Delta G(\vec{x})| \geq \lambda \\ 0, & \text{if} |\Delta G(\vec{x})| \leq \lambda \end{cases},$$

wherein $(\vec{x})$ represent a point, $\Delta G$ is a difference between G and a median-filtered version of G, and $\lambda$ is a predefined threshold wherein $\lambda$ is dynamically adapted to a level such that a pre-defined percentage of the differences $\Delta G$ is preserved, and wherein said outliers are removed by subtracting said residuals from said IQ image.

6. The method of claim 4, wherein said Wiener deconvolution filter includes a term proportional to $$DFT^{-1}\left\{\frac{DFT\{g(\vec{x})\}}{\sqrt{|S|^2 + \varepsilon}}\right\},$$

wherein DFT represents a discrete Fourier transform, S represents said spectrum of said point spread function, $g(\vec{x})$ represents said IQ image, and $0 < \varepsilon << 1$.

7. The method of claim 1 wherein said likelihood function includes a term to regularize said contour.

8. A method of segmenting a digitized ultrasound image comprising the steps of:
   providing a digitized in-phase/quadrature ultrasound image comprising a plurality of intensity data values defined on a N-dimensional grid of points;
   determining a magnitude of said in-phase/quadrature image and log-compressing said magnitude image;
   initializing a contour to a closed hypercurve that divides the image into two regions, determining for each region a Fisher-Tippett statistical distribution that maximizes a likelihood function of said distribution in each said region,
   propagating said contour in a normal direction using an Euler-Lagrange equation derived from said likelihood function, wherein said contour is a level set of a scalar function whose values are negative in one region and positive in the other regions, wherein said contour segments said image, and
   wherein said likelihood function includes the terms $$\int_\Omega (\ln 2 + 2l(\vec{x}) - \ln_{\sigma_i}^2 - \exp(2l(\vec{x}) - \ln_{\sigma_i}^2)) \, \vec{d}x$$

$$\int_{\Omega_o} (\ln 2 + 2l(\vec{x}) - \ln_{\sigma_o}^2 - \exp(2l(\vec{x}) - \ln_{\sigma_o}^2)) \, \vec{d}x$$

wherein $l(\vec{x})$ is the image intensity for point $(\vec{x})$, i and o denote regions isnide and outside the contour, respectively,. and $\sigma_i$ and $\sigma_o$ are the Fisher-Tippett parameters inside regions $\Omega_i$ and $\Omega_o$.

9. The method of claim 8, further comprising decorrelating said in-phase/quadrature image by applying a whitening filter on a Fourier transform of said image and deconvolving said filtered image, wherein spatial correlations are removed in said data.

10. A program storage device readable by a computer, tangibly embodying a program of instructions executable by the computer to perform the method steps for segmenting digitized ultrasound images, said method comprising the steps of:
   providing a digitized in-phase/quadrature (IQ) ultrasound image comprising a plurality of intensity data values defined on a N-dimensional grid of points;
   decorrelating said ultrasound image wherein spatial correlations are removed in said intensity data;
   modeling said decorrelated image intensities with a statistical distribution;
   propagating an active contour in said image by initializing a contour to a closed hypercurve that divides the image into two regions, determining for each region a statistical distribution that maximizes a likelihood function of said distribution in each region, and propagating said contour in a normal direction using an Euler-Lagrange equation derived from said likelihood function, wherein said contour is a level set of a scalar function whose values are negative in one region and positive in the other regions, wherein said contour segments said image, wherein said statistical distribution is a Fisher-Tippett distribution, and wherein said likelihood function includes the terms $$\int_{\Omega_i}(\ln 2 + 2l(\vec{x}) - \ln_{\sigma_i}^2 - \exp(2l(\vec{x}) - \ln_{\sigma_i}^2))\,\vec{d}x$$

$$\int_{\Omega_o}(\ln 2 + 2l(\vec{x}) - \ln_{\sigma_o}^2 - \exp(2l(\vec{x}) - \ln_{\sigma_o}^2))\,\vec{d}x$$

wherein $l(\vec{x})$ is image intensity for point $(\vec{x})$, i and o denote regions inside and outside the contour, respectively, and $\sigma_i$ and $\sigma_o$ are Fisher-Tippet paramaters inside regions $\Omega_i$ and $\Omega_o$.

11. The computer readable program storage device of claim 10, the method further comprising determining a magnitude of said in-phase/quadrature image and log-compressing said magnitude image.

12. The computer readable program storage device of claim 10, wherein decorrelation is performed using a whitening filter.

13. The computer readable program storage device of claim 12, wherein decorrelation comprises removing outliers from a Fourier transformed IQ image to obtain a reduced IQ image, filtering said reduced IQ image with a wavelet transform to obtain a spectrum of a point spread function, and applying a Wiener deconvolution filter to said IQ image and said point spread function spectrum to obtain a de-correlated image.

14. The computer readable program storage device of claim 13, wherein said outliers are defined by computing residuals $R(\vec{x})$ of said IQ image $G(\vec{x})$, $$R(\vec{x}) = \begin{cases} \operatorname{sign}(\Delta G(\vec{x})) \cdot (|\Delta G(\vec{x})| - \lambda), & \text{if } |\Delta G(\vec{x})| \geq \lambda \\ 0, & \text{if } |\Delta G(\vec{x})| \leq \lambda \end{cases},$$

wherein $(\vec{x})$ represent a point, $\Delta G$ is a difference between G and a median-filtered version of G, and $\lambda$ is a predefined threshold wherein $\lambda$ is dynamically adapted to a level such that a pre-defined percentage of the differences $\Delta G$ is preserved, and wherein said outliers are removed by subtracting said residuals from said IQ image.

15. The computer readable program storage device of claim 13, wherein said Wiener deconvolution filter includes a term proportional to $$DFT^{-1}\left\{\frac{DFT\{g(\vec{x})\}}{\sqrt{|S|^2 + \varepsilon}}\right\},$$

wherein DFT represents a discrete Fourier transform, S represents said spectrum of said point spread function, $g(\vec{x})$ represents said IQ image, and $0 < \varepsilon \ll 1$.

16. The computer readable program storage device of claim 10, wherein said likelihood function includes a term to regularize said contour.

\* \* \* \* \*